United States Patent
Qi

(10) Patent No.: US 9,467,224 B2
(45) Date of Patent: Oct. 11, 2016

(54) METHOD AND DEVICE FOR DETERMINING INPUT OPTICAL POWER

(71) Applicant: Huawei Technologies Co., Ltd., Shenzhen (CN)

(72) Inventor: Ming Qi, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 14/563,369

(22) Filed: Dec. 8, 2014

(65) Prior Publication Data

US 2015/0180571 A1    Jun. 25, 2015

(30) Foreign Application Priority Data

Dec. 19, 2013  (CN) .......................... 2013 1 0704035

(51) Int. Cl.
*H04B 10/079* (2013.01)
*H04B 10/69* (2013.01)

(52) U.S. Cl.
CPC .... *H04B 10/07955* (2013.01); *H04B 10/0799* (2013.01); *H04B 10/6911* (2013.01); *H04B 10/6931* (2013.01)

(58) Field of Classification Search
CPC .................... H04B 10/07955; H04B 10/6911; H04B 10/0799; H04B 10/6931
See application file for complete search history.

(56) References Cited

U.S. PATENT DOCUMENTS

| 2004/0062557 A1 | 4/2004 | Takashima et al. |
| 2009/0021300 A1* | 1/2009 | Romano ............ G01R 31/2822 330/2 |
| 2011/0182591 A1 | 7/2011 | Ikeuchi et al. |

FOREIGN PATENT DOCUMENTS

| CN | 101141203 A | 3/2008 |
| CN | 102710334 A | 10/2012 |

\* cited by examiner

*Primary Examiner* — Leslie Pascal
(74) *Attorney, Agent, or Firm* — Leydig, Voit & Mayer, Ltd.

(57) ABSTRACT

A method and a device for determining an input optical power are provided. The method include: after determining a bias current value of an optical amplifier unit when the optical amplifier unit amplifies a target optical signal and a voltage value output after an optical receiving unit converts the amplified target optical signal into an electrical signal, determining, according to a predetermined first correspondence that is among a bias current value, a voltage value, and an input optical power value and corresponds to a wavelength of the target optical signal, an input optical power value corresponding to the determined bias current value and the determined voltage value. By using the solution in the embodiments of the present invention, an input optical power of an optical signal on which optical amplification is performed can be determined.

8 Claims, 5 Drawing Sheets ated an input optical power of an optical signal on which optical amplification is performed.

According to a first aspect, a method for determining an input optical power is provided, including:

determining a bias current value of an optical amplifier unit when the optical amplifier unit amplifies a first specific optical signal, where the first specific optical signal includes at least one target optical signal, and determining a voltage value output after an optical receiving unit converts a target optical signal in the amplified first specific optical signal into an electrical signal, where the voltage value is a voltage value corresponding to the target optical signal in the amplified first specific optical signal; and determining, according to a predetermined first correspondence that is among a bias current value, a voltage value, and an input optical power value and corresponds to a wavelength of the target optical signal, an input optical power value corresponding to the determined bias current value and the determined voltage value.

With reference to the first aspect, in a first possible implementation manner, the first correspondence is determined according to the following steps:

for at least two bias current values of the optical amplifier unit when the optical amplifier unit amplifies a second specific optical signal, separately determining, under each of the bias current values, an input optical power value and a voltage value that correspond to a wavelength of a target optical signal included in the second specific optical signal; and establishing, according to the input optical power value and the voltage value that are determined under each of the bias current values and correspond to the wavelength of the target optical signal included in the second specific optical signal, the first correspondence corresponding to the wavelength of the target optical signal; where:

the second specific optical signal at least includes the target optical signal, and the voltage value corresponding to the wavelength of the target optical signal is a voltage value output after the optical receiving unit converts the target optical signal amplified by the optical amplifier unit into an electrical signal.

With reference to the first possible implementation manner of the first aspect, in a second possible implementation manner, the separately determining, under each of the bias current values, an input optical power value and a voltage value that correspond to a wavelength of a target optical signal included in the second specific optical signal includes:

under each of the bias current values, separately determining at least two input optical power values of the target optical signal after the optical amplifier unit amplifies the target optical signal, and separately determining at least two voltage values output after the optical receiving unit converts the target optical signal amplified by the optical amplifier unit into an electrical signal; and performing interpolation processing or fitting processing on the separately determined at least two input optical power values and at least two voltage values, so as to obtain the input optical power value and the voltage value that correspond, under each of the bias current values, to the wavelength of the target optical signal.

With reference to the first possible implementation manner of the first aspect or the second possible implementation manner of the first aspect, in a third possible implementation manner, the establishing, according to the input optical power value and the voltage value that are determined under each of the bias current values and correspond to the wavelength of the target optical signal included in the

METHOD AND DEVICE FOR DETERMINING INPUT OPTICAL POWER

CROSS-REFERENCE TO RELATED APPLICATIONS

This application claims priority to Chinese Patent Application No. 201310704035.9, filed on Dec. 19, 2013, which is hereby incorporated by reference in its entirety.

TECHNICAL FIELD

The present invention relates to the field of optical communications technologies, and in particular, to a method and a device for determining an input optical power.

BACKGROUND

In the field of optical communications, an input optical power is the amount of work done by input light per unit time.

Currently, an optical signal is directly input into a receiver. Because a one-to-one correspondence may exist between an input optical power Y of a received signal and a detection voltage value X of the receiver, a method for determining an input optical power in a traditional optical module is: (1) measuring several input optical powers and corresponding detection voltage values; (2) finding a relational expression between the input optical powers and the voltage values, for example, Y=f(X); and (3) calculating an input optical power value under any voltage value.

As requirements for a transmission distance of an optical signal and a transmission capacity become higher, compared with the traditional optical module, some optical modules currently use an optical amplification technology to amplify optical power of a signal and prolong the transmission distance.

FIG. 1 describes a structural diagram of an optical module that uses the optical amplification technology to amplify optical power of a signal. In FIG. 1, optical signals of multiple wavelengths are combined into one sequence of optical signals, and after being amplified by an optical amplifier, the sequence of optical signals are output to optical receivers, where each optical receiver corresponds to one wavelength, and each optical receiver receives an optical signal of a wavelength corresponding only to the optical receiver itself. Then, a received optical signal is converted into an electrical signal for output.

The optical amplifier amplifies an input optical power of an optical module to some extent, and what is detected by an optical receiver is an amplified optical power. Therefore, the input optical power cannot directly correspond to a detection voltage value of the optical receiver. As a result, the optical module that uses the optical amplification technology cannot use the foregoing method for determining an input optical power in the traditional optical module; and up to now, for the optical module that uses the optical amplification technology, there lacks a method for determining the input optical power.

In conclusion, currently, there is still no solution for determining an input optical power of an optical signal on which optical amplification is performed.

SUMMARY

The present invention provides a method and a device for determining an input optical power, which are used to determine second specific optical signal, the first correspondence corresponding to the wavelength of the target optical signal includes:

performing interpolation processing or fitting processing on all input optical power values and voltage values that are determined under each of the bias current values and correspond to the wavelength, so as to obtain the first correspondence corresponding to the wavelength.

According to a second aspect, a device for determining an input optical power is provided, including:

a first determining module, configured to determine a bias current value of an optical amplifier unit when the optical amplifier unit amplifies a first specific optical signal, where the first specific optical signal includes at least one target optical signal, and determine a voltage value output after an optical receiving unit converts a target optical signal in the amplified first specific optical signal into an electrical signal, where the voltage value is a voltage value corresponding to the target optical signal in the amplified first specific optical signal; and a second determining module, configured to determine, according to a predetermined first correspondence that is among a bias current value, a voltage value, and an input optical power value and corresponds to a wavelength of the target optical signal, an input optical power value corresponding to the bias current value determined by the first determining module and the voltage value determined by the first determining module.

With reference to the second aspect, in a first possible implementation manner, the second determining module is specifically configured to determine the first correspondence according to the following steps:

for at least two bias current values of the optical amplifier unit when the optical amplifier unit amplifies a second specific optical signal, separately determining, under each of the bias current values, an input optical power value and a voltage value that correspond to a wavelength of a target optical signal included in the second specific optical signal; and establishing, according to the input optical power value and the voltage value that are determined under each of the bias current values and correspond to the wavelength of the target optical signal included in the second specific optical signal, the first correspondence corresponding to the wavelength of the target optical signal; where:

the second specific optical signal at least includes the target optical signal, and the voltage value corresponding to the wavelength of the target optical signal is a voltage value output after the optical receiving unit converts the target optical signal amplified by the optical amplifier unit into an electrical signal.

With reference to the first possible implementation manner of the second aspect, in a second possible implementation manner, the second determining module is specifically configured to:

under each of the bias current values, separately determine at least two input optical power values of the target optical signal after the optical amplifier unit amplifies the target optical signal, and separately determine at least two voltage values output after the optical receiving unit converts the target optical signal amplified by the optical amplifier unit into an electrical signal; and perform interpolation processing or fitting processing on the separately determined at least two input optical power values and at least two voltage values, so as to obtain the input optical power value and the voltage value that correspond, under each of the bias current values, to the wavelength of the target optical signal.

With reference to the first possible implementation manner of the second aspect or the second possible implementation manner of the second aspect, in a third possible implementation manner, the second determining module is specifically configured to:

perform interpolation processing or fitting processing on all input optical power values and voltage values that are determined under each of the bias current values and correspond to the wavelength, so as to obtain the first correspondence corresponding to the wavelength.

In embodiments of the present invention, after a bias current value of an optical amplifier unit when the optical amplifier unit amplifies a target optical signal and a voltage value output after an optical receiving unit converts the amplified target optical signal into an electrical signal are determined, an input optical power value corresponding to the determined bias current value and the determined voltage value is determined according to a predetermined first correspondence that is among a bias current value, a voltage value, and an input optical power value and corresponds to a wavelength of the target optical signal, that is, an input optical power of an optical signal on which optical amplification is performed is determined.

DESCRIPTION OF EMBODIMENTS

In embodiments of the present invention, after a bias current value of an optical amplifier unit when the optical amplifier unit amplifies a target optical signal and a voltage value output after an optical receiving unit converts the amplified target optical signal into an electrical signal are determined, an input optical power value corresponding to the determined bias current value and the determined voltage value is determined according to a predetermined first correspondence that is among a bias current value, a voltage value, and an input optical power value and corresponds to a wavelength of the target optical signal, that is, an input optical power of an optical signal on which optical amplification is performed is determined.

The bias current value is used to represent a magnitude of a current of an optical amplifier. A gain value of the optical amplifier can be determined by using the bias current value, where a gain is a ratio of an output optical power to an input optical power of the optical amplifier; a voltage value can be used to determine an output optical power value; and therefore the input optical power, that is, an input optical power of an optical signal transmitted by using an optical amplification technology, can be determined according to the bias current value and the voltage value.

In the embodiments of the present invention, a first correspondence that is among a bias current value, a voltage value, and an input optical power value and corresponds to a wavelength is preconfigured, and then a bias current value and a voltage value that are related to an optical signal of the wavelength are determined, and finally an input optical power value of the optical signal of the wavelength can be determined according to the first correspondence corresponding to the wavelength.

The following further describes the embodiments of the present invention in detail with reference to the accompanying drawings of this specification.

Figure 1:
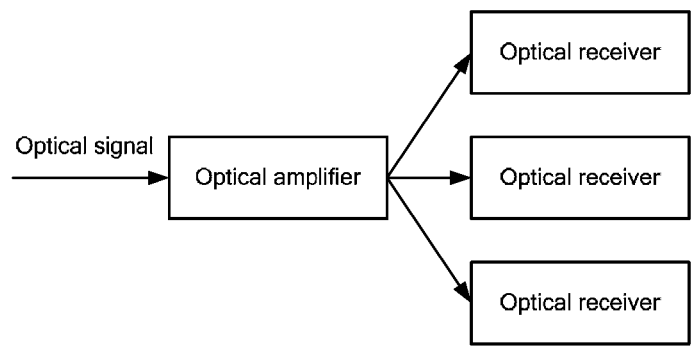
FIG. 1 is a schematic structural diagram of an optical module that uses an optical amplification technology to amplify optical power of a signal in the prior art.
Figure 2:
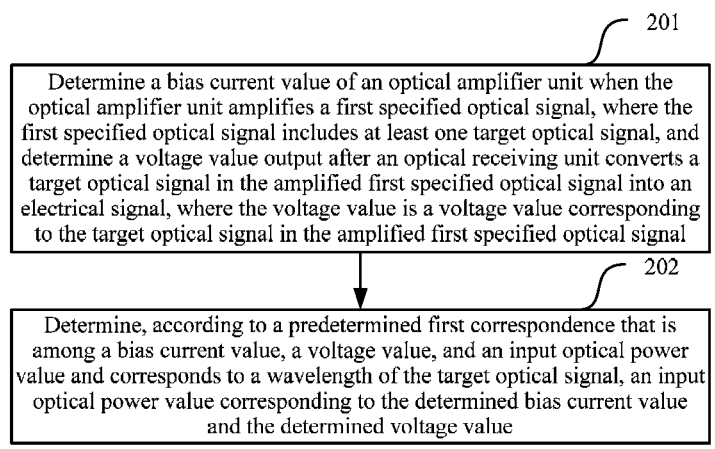
FIG. 2 is a schematic flowchart of a method for determining an input optical power according to Embodiment 1 of the present invention.

As shown in FIG. 2, a method for determining an input optical power according to Embodiment 1 of the present invention includes:

Step 201: Determine a bias current value of an optical amplifier unit when the optical amplifier unit amplifies a first specific optical signal, where the first specific optical signal includes at least one target optical signal, and determine a voltage value output after an optical receiving unit converts a target optical signal in the amplified first specific optical signal into an electrical signal, where the voltage value is a voltage value corresponding to the target optical signal in the amplified first specific optical signal.

Step 202: Determine, according to a predetermined first correspondence that is among a bias current value, a voltage value, and an input optical power value and corresponds to a wavelength of the target optical signal, an input optical power value corresponding to the determined bias current value and the determined voltage value.

In this embodiment of the present invention, first correspondences among bias current values, voltage values, and input optical power values are pre-established for different wavelengths, and each wavelength has a corresponding first correspondence.

The following describes in detail how a first correspondence among a bias current value, a voltage value, and an input optical power value is established.

First, for at least two bias current values of the optical amplifier unit when the optical amplifier unit amplifies a second specific optical signal, an input optical power value and a voltage value that correspond to a wavelength of a target optical signal included in the second specific optical signal are separately determined under each of the bias current values.

Then, the first correspondence corresponding to the wavelength of the target optical signal is established according to the input optical power value and the voltage value that are determined under each of the bias current values and correspond to the wavelength of the target optical signal included in the second specific optical signal, where, the second specific optical signal at least includes the target optical signal, and the voltage value corresponding to the wavelength of the target optical signal is a voltage value output after the optical receiving unit converts the target optical signal amplified by the optical amplifier unit into an electrical signal.

Specifically, step 1: For a wavelength A, determine a bias current value of the optical amplifier unit when the optical amplifier unit amplifies a second specific optical signal that includes a target optical signal of the wavelength A.

Step 2: Under the bias current value, determine a second correspondence that is between an input optical power value and a voltage value and corresponds to the wavelength A.

Specifically, under each of the bias current values, separately determine at least two input optical power values of the target optical signal after the optical amplifier unit amplifies the target optical signal, and separately determine at least two voltage values output after the optical receiving unit converts the target optical signal amplified by the optical amplifier unit into an electrical signal; and perform interpolation processing or fitting processing on the separately determined at least two input optical power values and at least two voltage values, so as to obtain the input optical power value and the voltage value that correspond, under each of the bias current values, to the wavelength of the target optical signal.

That is, actual optical power values of multiple target optical signals of the wavelength A are acquired (for example, the actual optical power values can be acquired by using a device such as an optical power meter and then be input to an entity for performing this embodiment of the present invention), and a voltage value output after the optical receiving unit converts each of the target optical signals, which are amplified by the optical amplifier unit, of the wavelength A into an electrical signal is determined. In this way, the second correspondence that is between an input optical power value and a voltage value and corresponds to the wavelength A is established under the bias current value of the optical amplifier unit when the optical amplifier unit performs amplification.

For example, under a fixed bias current of the optical amplifier unit, actual values of multiple different input optical powers of the target optical signals of the wavelength A that are amplified by the optical amplifier unit and voltage values corresponding to the target optical signals, which are amplified by the optical amplifier unit, of the wavelength A and on the optical receiving unit are acquired, and then a two-dimensional curve relationship (that is, the second correspondence) that is between an input optical power value and a voltage value and corresponds to the wavelength A is obtained under the bias current by interpolation or fitting.

A larger number of acquired input optical power values and voltage values leads to a more accurate obtained two-dimensional curve relationship.

In implementation, a method for obtaining the two-dimensional curve relationship may be interpolation or may be fitting. A relational expression may be a linear function or a non-linear function such as a polynomial, and different functional relationships may further be selected according to a range segment of an input optical power value. A specific selection depends on the greatness of an error between a calculated value and an actual value.

For example, when an acquired input optical power value is less than a value (for example, −10 dBm), a polynomial function may be used; and when the acquired input optical power value is greater than the value, a linear function may be used.

Step 3: Under the bias current value, after the second correspondence corresponding to the wavelength A is determined, continue to repeat step 1 and step 2 under another bias current value, and finally obtain second correspondences corresponding to the wavelength A under multiple bias currents.

Step 4: Perform interpolation processing or fitting processing on all input optical power values and voltage values that are determined under each of the bias current values and correspond to the wavelength, so as to obtain the first correspondence corresponding to the wavelength.

Specifically, curved surface interpolation or fitting is performed on a two-dimensional curve relationship obtained under each bias current value, so as to obtain a three-dimensional curve relationship among a different bias current, voltage value, and input optical power. A method for obtaining the three-dimensional curve relationship may be interpolation or may be fitting. A relational expression may be a linear function or a non-linear function such as a polynomial, and different functional relationships may further be selected according to a range segment of an input optical power. A calculating method is selected depending on a value of an error between a calculated value and an actual value.

If the first specific optical signal and the second specific optical signal in this embodiment of the present invention include target optical signals of at least two wavelengths, the first specific optical signal is a multiplexed optical signal.

The first specific optical signal includes target optical signals with at least two wavelengths.

In step 202, for a wavelength, a voltage value corresponding to a target optical signal of the wavelength is determined from the voltage value output by the optical receiving unit, where the voltage value corresponding to the wavelength is a voltage value output after the optical receiving unit converts the target optical signal of the wavelength in the amplified first specific optical signal into an electrical signal.

An input optical power value of the target optical signal is determined according to the first correspondence corresponding to the wavelength, the determined bias current value, and the determined voltage value corresponding to the target optical signal of the wavelength.

Specifically, the first specific optical signal includes target optical signals of at least two wavelengths, and therefore the optical receiving unit may output a voltage value for each target optical signal of a wavelength.

First, a wavelength is determined, for example, a wavelength A; and then, a voltage value corresponding to a target optical signal of the wavelength A and a bias current value of the optical amplifier unit when the optical amplifier unit amplifies a first specific optical signal that includes the target optical signal of the wavelength A are determined.

Finally, an input optical power value that corresponds to the voltage value corresponding to the target optical signal of the wavelength A and corresponds the bias current value of the optical amplifier unit when the optical amplifier unit amplifies the first specific optical signal that includes the target optical signal of the wavelength A may be determined according to a first correspondence corresponding to the wavelength A.

During implementation, the optical amplifier unit in this embodiment of the present invention may be an amplifier, such as an SOA (Semiconductor Optical Amplifier, semiconductor optical amplifier) or an EDFA (Erbium-doped Optical Fiber Amplifier, erbium-doped optical fiber amplifier).

In this embodiment of the present invention, after a bias current value of an optical amplifier unit when the optical amplifier unit amplifies a target optical signal and a voltage value output after an optical receiving unit converts the amplified target optical signal into an electrical signal are determined, an input optical power value corresponding to the determined bias current value and the determined voltage value is determined according to a predetermined first correspondence that is among a bias current value, a voltage value, and an input optical power value and corresponds to a wavelength of the target optical signal, that is, an input optical power of an optical signal on which optical amplification is performed is determined.

Figure 3:
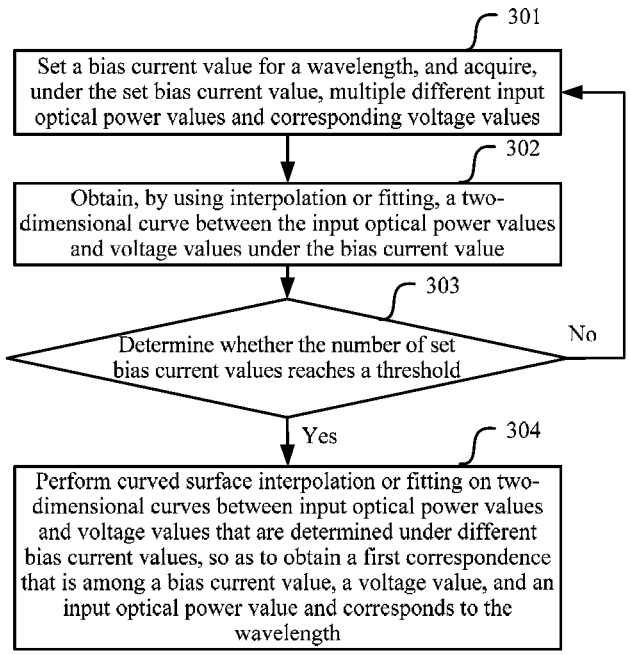
FIG. 3 is a schematic flowchart of a method for determining a first correspondence according to Embodiment 2 of the present invention.

As shown in FIG. 3, a method for determining a first correspondence according to Embodiment 2 of the present invention includes:

Step 301: Set a bias current value for a wavelength, and acquire, under the set bias current value, multiple different input optical power values and corresponding voltage values;

Step 302: Obtain, by using interpolation or fitting, a two-dimensional curve between the input optical power values and voltage values under the bias current value;

Step 303: Determine whether the number of set bias current values reaches a threshold, if yes, perform step 304, and otherwise, return to step 301; and Step 304: Perform curved surface interpolation or fitting on two-dimensional curves between input optical power values and voltage values that are determined under different bias current values, so as to obtain a first correspondence that is among a bias current value, a voltage value, and an input optical power value and corresponds to the wavelength.

In FIG. 3, a first correspondence corresponding to a wavelength is determined. A method for each wavelength is the same as that in FIG. 3, and it is only required to repeatedly perform the above steps, which are not described herein again.

Based on a same inventive concept, an embodiment of the present invention further provides a device for determining an input optical power. Because a problem solving principle of the device is similar to the method for determining an input optical power in the embodiments of the present invention, for implementation of the device, reference may be made to the implementation of the method, and repeated content is not described herein again.

Figure 4:
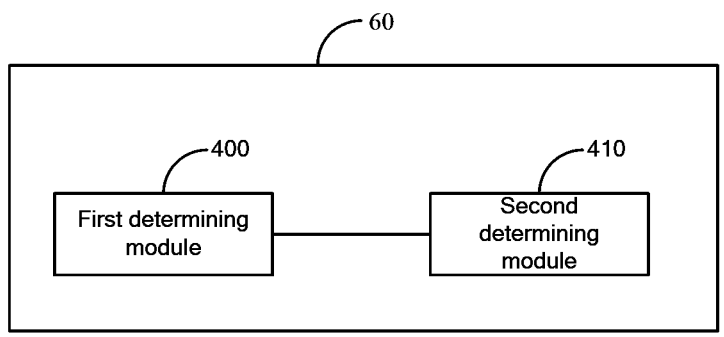
FIG. 4 is a schematic structural diagram of a device for determining an input optical power according to Embodiment 3 of the present invention.

As shown in FIG. 4, a device 60 for determining an input optical power in Embodiment 3 of the present invention includes a first determining module 400 and a second determining module 410, where:

the first determining module 400 is configured to determine a bias current value of an optical amplifier unit when the optical amplifier unit amplifies a first specific optical signal, where the first specific optical signal includes at least one target optical signal, and determine a voltage value output after an optical receiving unit converts a target optical signal in the amplified first specific optical signal into an electrical signal, where the voltage value is a voltage value corresponding to the target optical signal in the amplified first specific optical signal; and the second determining module 410 is configured to determine, according to a predetermined first correspondence that is among a bias current value, a voltage value, and an input optical power value and corresponds to a wavelength of the target optical signal, an input optical power value corresponding to the bias current value determined by the first determining module 400 and the voltage value determined by the first determining module 400.

Preferably, the second determining module 410 is specifically configured to determine the first correspondence according to the following steps:

for at least two bias current values of the optical amplifier unit when the optical amplifier unit amplifies a second specific optical signal, separately determining, under each of the bias current values, an input optical power value and a voltage value that correspond to a wavelength of a target optical signal included in the second specific optical signal;

and establishing, according to the input optical power value and the voltage value that are determined under each of the bias current values and correspond to the wavelength of the target optical signal included in the second specific optical signal, the first correspondence corresponding to the wavelength of the target optical signal; where:

the second specific optical signal at least includes the target optical signal, and the voltage value corresponding to the wavelength of the target optical signal is a voltage value output after the optical receiving unit converts the target optical signal amplified by the optical amplifier unit into an electrical signal.

Preferably, the second determining module 410 is specifically configured to:

under each of the bias current values, separately determine at least two input optical power values of the target optical signal after the optical amplifier unit amplifies the target optical signal, and separately determine at least two voltage values output after the optical receiving unit converts the target optical signal amplified by the optical amplifier unit into an electrical signal; and perform interpolation processing or fitting processing on the separately determined at least two input optical power values and at least two voltage values, so as to obtain the input optical power value and the voltage value that correspond, under each of the bias current values, to the wavelength of the target optical signal.

Preferably, the second determining module 410 is specifically configured to:

perform interpolation processing or fitting processing on all input optical power values and voltage values that are determined under each of the bias current values and correspond to the wavelength, so as to obtain the first correspondence corresponding to the wavelength.

In this embodiment of the present invention, after a bias current value of an optical amplifier unit when the optical amplifier unit amplifies a target optical signal and a voltage value output after an optical receiving unit converts the amplified target optical signal into an electrical signal are determined, an input optical power value corresponding to the determined bias current value and the determined voltage value is determined according to a predetermined first correspondence that is among a bias current value, a voltage value, and an input optical power value and corresponds to a wavelength of the target optical signal, that is, an input optical power of an optical signal on which optical amplification is performed is determined.

Figure 5:
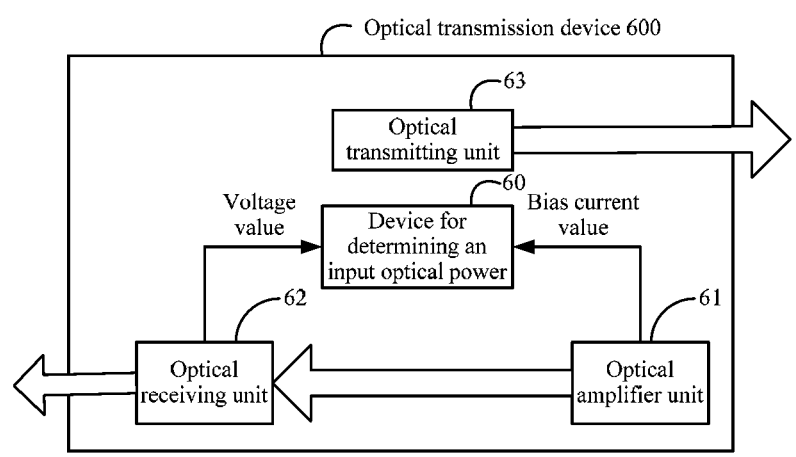
FIG. 5 is a schematic structural diagram of an optical transmission device according to Embodiment 4 of the present invention.

As shown in FIG. 5, an optical transmission device 600 in Embodiment 4 of the present invention includes a device 60 for determining an input optical power, an optical amplifier unit 61, and an optical receiving unit 62 in this embodiment of the present invention, where:

the optical amplifier unit 61 is configured to amplify a received first specific optical signal; and the optical receiving unit 62 is configured to: convert the amplified first specific optical signal into an electrical signal for output, and convert an optical power into a corresponding voltage value.

If the first specific optical signal received by the optical amplifier unit 61 includes multiple target optical signals of different wavelengths, the optical receiving unit 62 further needs to perform wavelength division demultiplexing on the first specific optical signal first, so as to obtain the multiple target optical signals of different wavelengths, then separately converts each of the target optical signals into an electrical signal for output, and converts an optical power into a corresponding voltage value. For details, reference may be made to FIG. 6.

Figure 6:
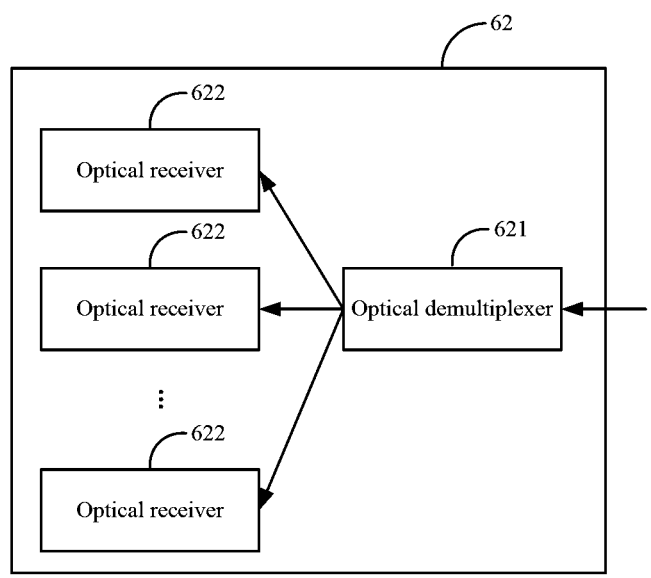
FIG. 6 is a schematic structural diagram of an optical receiving unit in optical transmission device according to Embodiment 5 of the present invention.

In FIG. 6, an optical receiving unit 62 includes an optical demultiplexer 621 and multiple optical receivers 622, where each optical receiver 622 corresponds to a different wavelength.

The optical demultiplexer 621 is configured to perform wavelength division demultiplexing on a received first specific optical signal that includes multiple target optical signals of different wavelengths, so as to obtain the target optical signals of different wavelengths.

An optical receiver 622 is configured to detect the target optical signals output by the optical demultiplexer 621, receive a target optical signal of a corresponding wavelength, convert the received target optical signal into an electrical signal for output, and convert an optical power into a corresponding voltage value.

In this embodiment of the present invention, the device 60 for determining an input optical power may be a separate processor or may be a central processor in an optical transmission device 600.

Preferably, the optical transmission device 600 in this embodiment of the present invention may further include:

an optical transmitting unit 63, configured to convert the electrical signal into a target optical signal for output.

Preferably, the optical transmitting unit 63 may perform multiplexing on multiple target optical signals of different wavelengths for output. For details, reference may be made to FIG. 7.

Figure 7:
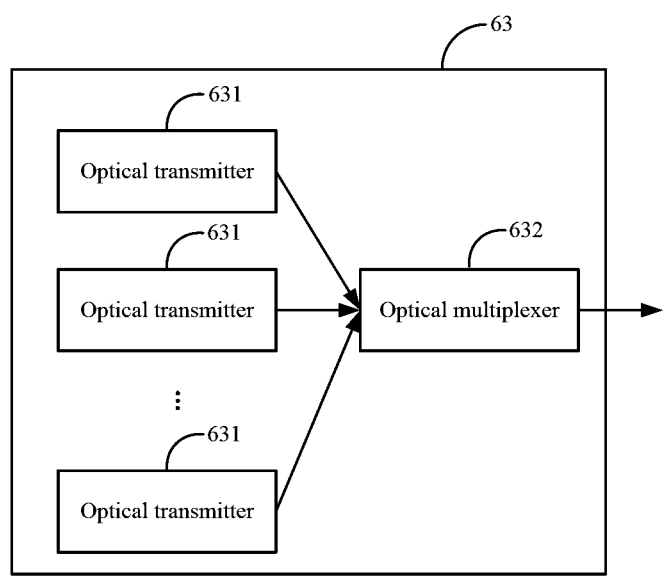
FIG. 7 is a schematic structural diagram of an optical transmitting unit in optical transmission device according to Embodiment 6 of the present invention.

As shown in FIG. 7, an optical transmitting unit 63 in optical transmission device 600 in Embodiment 6 of the present invention includes multiple optical transmitters 631 and an optical multiplexer 632, where each optical transmitter 631 corresponds to a different wavelength.

An optical transmitter 631 is configured to convert an electrical signal into a corresponding target optical signal and input the target optical signal to the optical multiplexer 632.

The optical multiplexer 632 is configured to perform wavelength division multiplexing for target optical signals received from the multiple optical transmitters 631 and output a beam of light.

In this embodiment of the present invention, after a bias current value of an optical amplifier unit 61 when the optical amplifier unit 61 amplifies a target optical signal and a voltage value output after an optical receiving unit 62 converts the amplified target optical signal into an electrical signal are determined, an input optical power value corresponding to the determined bias current value and the determined voltage value is determined according to a predetermined first correspondence that is among a bias current value, a voltage value, and an input optical power value and corresponds to a wavelength of the target optical signal, that is, an input optical power of an optical signal on which optical amplification is performed is determined.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for determining an input optical power in an optical transmission device, the method comprising:
   determining, by a processor, a bias current value of an optical amplifier unit when the optical amplifier unit amplifies a first optical signal to an amplified first optical signal, wherein the first optical signal comprises a target optical signal;
   determining, by the processor, a voltage value output after an optical receiving unit converts the target optical signal in the amplified first optical signal into an electrical signal, wherein the voltage value is a voltage value corresponding to the target optical signal in the amplified first optical signal; and
   determining, by the processor, according to a predetermined correspondence that is among a bias current value, a voltage value, and an input optical power value that correspond to a wavelength of the target optical signal, an input optical power value corresponding to the bias current value and the voltage value.

2. The method according to claim 1, wherein predetermining the correspondence that is among the bias current value, the voltage value, and the input optical power value that correspond to the wavelength of the target optical signal comprises:
   for at least two bias current values of the optical amplifier unit when the optical amplifier unit amplifies a second optical signal, separately determining, under each of the at least two bias current values, an input optical power value and a voltage value that correspond to a wavelength of the target optical signal comprised in the second optical signal; and
   establishing, according to the input optical power value and the voltage value that are determined under each of the at least two bias current values and correspond to the wavelength of the target optical signal comprised in the second optical signal, the correspondence corresponding to the wavelength of the target optical signal;
   wherein the second optical signal comprises the target optical signal, and the voltage value corresponding to the wavelength of the target optical signal is a voltage value output after the optical receiving unit converts the target optical signal amplified by the optical amplifier unit into an electrical signal.

3. The method according to claim 2, wherein the separately determining, under each of the at least two bias current values, the input optical power value and the voltage value that correspond to the wavelength of the target optical signal comprised in the second optical signal comprises:
   under each of the at least two bias current values, separately determining at least two input optical power values of the target optical signal after the optical amplifier unit amplifies the target optical signal, and separately determining at least two voltage values output after the optical receiving unit converts the target optical signal amplified by the optical amplifier unit into an electrical signal; and
   performing interpolation processing or fitting processing on the separately determined at least two input optical power values and at least two voltage values, so as to obtain the input optical power value and the voltage value that correspond, under each of the at least two bias current values, to the wavelength of the target optical signal.

4. The method according to claim 2, wherein the establishing, according to the input optical power value and the voltage value that are determined under each of the at least two bias current values and correspond to the wavelength of the target optical signal comprised in the second optical signal, the correspondence corresponding to the wavelength of the target optical signal comprises:
   performing interpolation processing or fitting processing on all input optical power values and all voltage values that are determined under each of the at least two bias current values and correspond to the wavelength, so as to obtain the correspondence corresponding to the wavelength.

5. An optical transmission device, comprising:
   an optical amplifier;
   an optical receiving unit; and
   a processor, configured to:
     determine a bias current value of the optical amplifier when the optical amplifier amplifies a first optical signal to an amplified first optical signal, wherein the first optical signal comprises a target optical signal;
     determine a voltage value output after the optical receiving unit converts the target optical signal in the amplified first optical signal into an electrical signal, wherein the voltage value is a voltage value corresponding to the target optical signal in the amplified first optical signal; and determine, according to a predetermined correspondence that is among a bias current value, a voltage value, and an input optical power value that corresponds to a wavelength of the target optical signal, an input optical power value corresponding to the bias current value and the voltage value.

6. The optical transmission device according to claim 5, wherein the determining the correspondence comprises:
for at least two bias current values of the optical amplifier unit when the optical amplifier amplifies a second optical signal, separately determining, under each of the at least two bias current values, an input optical power value and a voltage value that correspond to a wavelength of the target optical signal comprised in the second optical signal; and
establishing, according to the input optical power value and the voltage value that are determined under each of the at least two bias current values and correspond to the wavelength of the target optical signal comprised in the second optical signal, the correspondence corresponding to the wavelength of the target optical signal;
wherein the second optical signal comprises the target optical signal, and the voltage value corresponding to the wavelength of the target optical signal is a voltage value output after the optical receiving unit converts the target optical signal amplified by the optical amplifier into an electrical signal.

7. The optical transmission device according to claim 6, wherein the processor is further configured to:
under each of the at least two bias current values, separately determine at least two input optical power values of the target optical signal after the optical amplifier amplifies the target optical signal, and separately determine at least two voltage values output after the optical receiving unit converts the target optical signal amplified by the optical amplifier into an electrical signal; and
perform interpolation processing or fitting processing on the separately determined at least two input optical power values and at least two voltage values, so as to obtain the input optical power value and the voltage value that correspond, under each of the at least two bias current values, to the wavelength of the target optical signal.

8. The optical transmission device according to claim 6, wherein the processor is further configured to:
perform interpolation processing or fitting processing on all input optical power values and voltage values that are determined under each of the at least two bias current values and correspond to the wavelength, so as to obtain the correspondence corresponding to the wavelength.

\* \* \* \* \*

UNITED STATES PATENT AND TRADEMARK OFFICE
CERTIFICATE OF CORRECTION

PATENT NO. : 9,467,224 B2
APPLICATION NO. : 14/563369
DATED : October 11, 2016
INVENTOR(S) : Ming Qi It is certified that error appears in the above-identified patent and that said Letters Patent is hereby corrected as shown below:

In the Claims

Column 13, Line 10, the term "unit" should be deleted.

Signed and Sealed this
Twenty-first Day of March, 2017

Michelle K. Lee
*Director of the United States Patent and Trademark Office*